(No Model.) 2 Sheets—Sheet 1.

N. KOPP.
MANUFACTURE OF GLASSWARE.

No. 495,048. Patented Apr. 11, 1893.

WITNESSES:
Darwin S. Wolcott
F. E. Gaither

INVENTOR,
Nicholas Kopp,
by George H. Christy
Atty.

(No Model.) 2 Sheets—Sheet 2.

N. KOPP.
MANUFACTURE OF GLASSWARE.

No. 495,048. Patented Apr. 11, 1893.

WITNESSES: INVENTOR,

UNITED STATES PATENT OFFICE.

NICHOLAS KOPP, OF FOSTORIA, OHIO.

MANUFACTURE OF GLASSWARE.

SPECIFICATION forming part of Letters Patent No. 495,048, dated April 11, 1893.

Application filed July 26, 1892. Serial No. 441,252. (No model.)

*To all whom it may concern:*

Be it known that I, NICHOLAS KOPP, a citizen of the United States, residing at Fostoria, in the county of Seneca and State of Ohio, have invented or discovered certain new and useful Improvements in the Manufacture of Glassware, of which improvements the following is a specification.

The invention described herein relates to certain improvements in the manufacture of articles of glass-ware such as lamp shades and other analogous articles.

Figure 3:
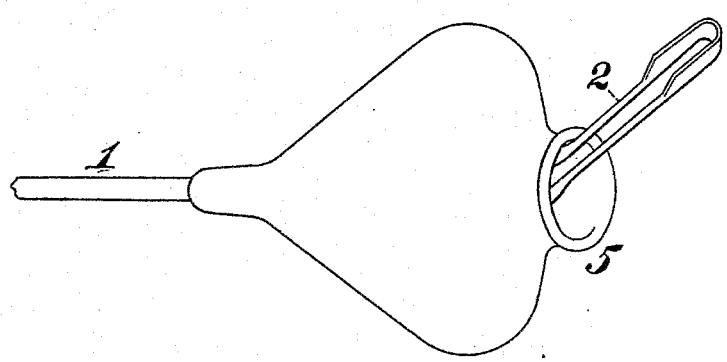
Figure 4:
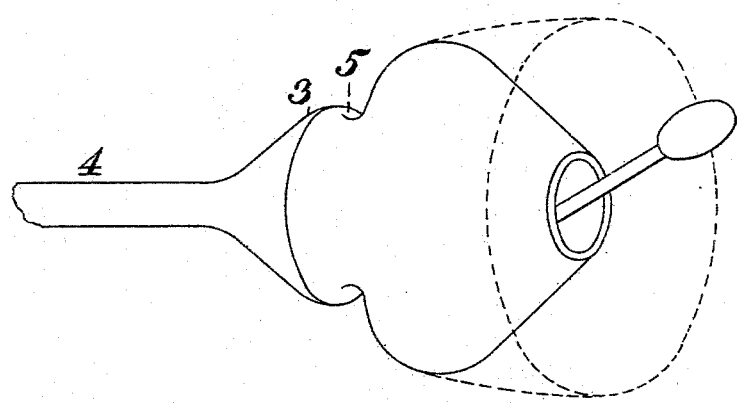
Figure 5:
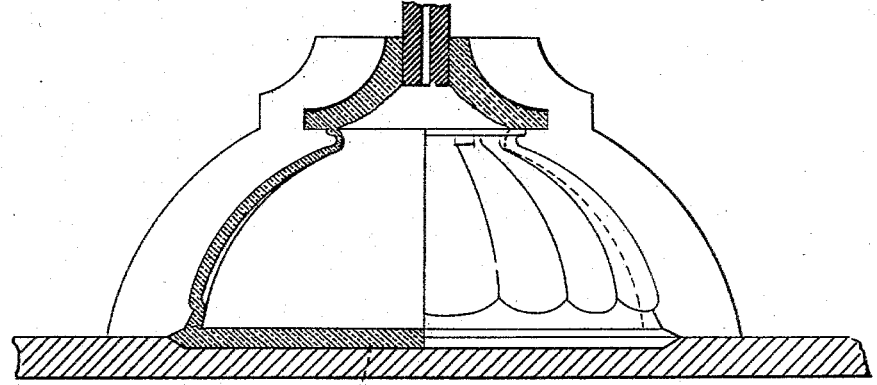

It has heretofore been customary in the manufacture of lamp shades having knobs or projections on their surfaces, to expand a ball of glass gathered on the end of a blow pipe, into a mold having suitable recesses or grooves in its inner walls, thereby forming knobs or ribs on the surface of the ball. The ball is then removed from the mold, heated until sufficiently plastic, and then blown out in the usual manner, and one side opened out to form the upper end of the shade as shown in Figure 3. This upper end is then attached to a glass disk on the end of a rod usually termed a post, by heating the disk sufficiently to cause the upper end of the partially formed shade to adhere thereto. The blow-pipe is then detached from the ball or partially formed shade, which is then heated and the opposite end or side of the ball is opened up as shown in Fig. 4, and the ball is forced down over a former to impart the desired shape. A series of vertical ribs have also been formed on shades by blowing a ball of glass in a three part mold, having suitable grooves in its wall as shown in Fig. 5. After the shade has been shaped it is removed from the mold, and the blow pipe and the sheet of glass *a* attached to the lower edges of the shade are broken off. The rough edges formed in removing such parts from the upper and lower ends of the shade are ground and smoothed off. In the former method the knobs or projections are produced by employing an additional amount of glass over and above that necessary for the formation of the shade, and while in the latter method the use of this excess of glass is avoided, it is necessary to cut and trim the edges of the shade, thereby adding to the cost of manufacture.

The object of my present invention is to so manufacture the shade that the ribs or projections will be hollow, and also to avoid the necessity of trimming and grinding the edge of the shade.

The invention is hereinafter more fully described and claimed.

Figure 1:
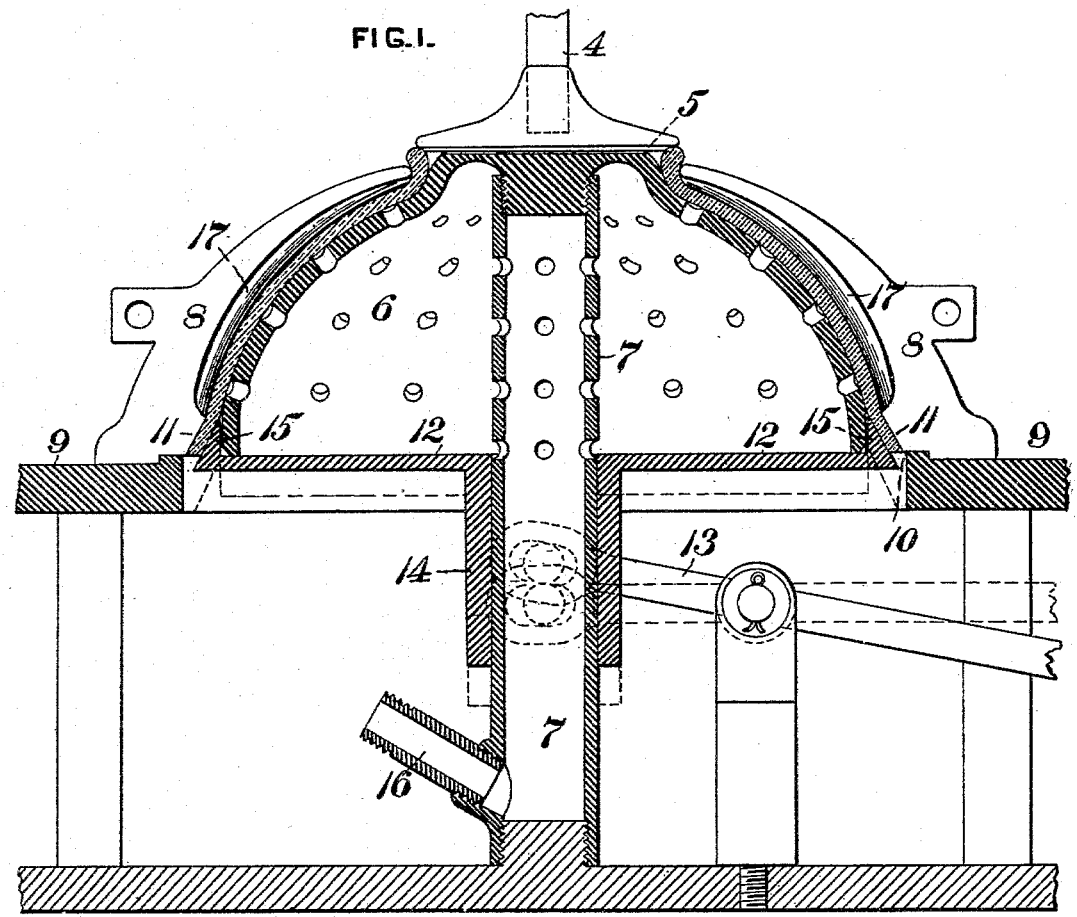
Figure 2:
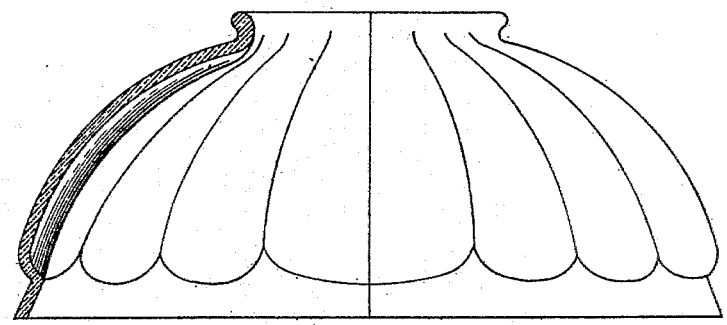

In the accompanying drawings forming a part of this specification, Fig. 1 is a sectional elevation of the machine employed in the practice of my invention. Fig. 2 is a view partly in elevation and partly in section of a completed shade. Figs. 3 and 4 illustrate steps in the operation of forming the shade prior to the final shaping and formation of the knobs or ribs thereon, and Fig. 5 is a view partly in elevation and partly in section of the form of mold now in use in the manufacture of shades.

In the practice of my invention a ball of glass is gathered on the end of a blow-pipe 1 and blown in the usual manner to the desired dimensions. At a point opposite the blow-pipe the ball is opened and shaped by a suitable tool 2, to the form desired in the upper end of the shade. The glass disk 3 on the post or rod 4 is then heated and the neck or upper end 5 of the ball is stuck thereon forming a hermetic joint. The ball is again heated and the opposite end of the ball opened out as shown in Fig. 4. If necessary the partially formed shade is again heated and placed over the hollow perforated dome or support 6, which is secured to a pipe 7, having perforations within the dome. The sections of a three-part mold 8 which rests upon a table 9, are then closed around the dome and shade resting thereon, the table being provided with an opening through which the dome projects. In order that the sections of the mold may be brought to proper position a bead or series of projections 10 is formed on the table around the opening therein. The mold sections are constructed at their upper ends so as to bear against the neck 5 of the shade and thereby bring the same to proper shape, or preserve such shape if produced during prior operations. The lower ends of the sections are properly constructed as at 11, to impart the desired contour or shape to the lower end of the shade. After the mold sections have been closed, the plate 12 is raised by depressing the lever 13, whose inner end is connected to the sleeve 14 surrounding the pipe 7, which serves as a guide for the sleeve and the plate carried by the latter. A flange 15 formed around the edge of the plate 12, is so constructed as regards its outer face, as to press the lower edge of the shade against the portion 11 of the mold, and thereby properly shape the lower end of the shade. As soon as the plate 12 is raised, thereby shaping the lower end of the shade as stated and forming a practically hermetic joint with such lower end, air under pressure is admitted into the pipe 7 and dome 6, the pipe being connected as at 16 to a suitable supply of air under pressure. The air passing out through the perforations in the dome, will force the glass out against the inner wall of the mold and into the grooves or recesses 17 formed therein, thereby imparting the desired shape to the shade, but also forming hollow ribs or projections on the shade as shown in Fig. 2.

The formation of hollow ribs effects a considerable saving in the amount of glass used in the manufacture of shades, and further, when pressing the shades to final shape it is necessary to provide a recess or pocket in the mold for the reception of surplus glass, which must subsequently be cut off from the lower edge of the shade, and the rough edge formed by the removal of the surplus must be ground. In blowing the shade to final form, no surplus glass need be provided, as if the operator has gathered too much it will be evenly distributed along the walls of the shade, and if a small amount has been gathered the walls of the shade will be only a little thinner. Thus the fine polished edge formed when heating the ball prior to its being placed in the mold is uninjured.

While it is preferred to employ the dome 6, as it affords a good support for the partially formed shade, until acted on by the air under pressure, it may be entirely omitted, the shade being held in place by the post 4 until caught by the edges of the mold.

I claim herein as my invention—

1. As an improvement in the art of manufacturing glass shades and other like articles, the method herein described which consists in blowing a glass ball, opening one side of the ball and expanding it to approximately the size and shape desired, and then bringing the partially shaped article to the required shape and size by causing it to conform to a suitably shaped mold by air pressure applied to the interior wall of the partially shaped article, substantially as set forth.

2. As an improvement in the art of manufacturing glass shades and other like articles having ribs or projections, the method herein described which consists in blowing a glass ball, opening one side of the ball and expanding it to approximately the size and shape desired and then causing the approximately shaped article to conform to a suitably shaped mold provided on its inner wall with grooves or recesses, by air pressure applied to the inner wall of the partially shaped article, thereby forming hollow ribs or projections in the wall of the shade or other article, substantially as set forth.

3. In a machine for manufacturing shades, and other like articles, the combination of a hollow support having perforated walls, an air pipe extending into said support, a mold surrounding said support and a plate for closing the lower end of the mold, substantially as set forth.

4. In a machine for manufacturing shades and other like articles, the combination of a hollow support having perforated walls, an air pipe extending into said support, a mold surrounding said support and a movable plate constructed to press the lower end of the article operated upon against the mold, and close the lower end of the latter, substantially as set forth.

In testimony whereof I have hereunto set my hand.

NICHOLAS KOPP.

Witnesses:
PHILIP Y. PENDLETON,
DARWIN S. WOLCOTT.